Figure 1:
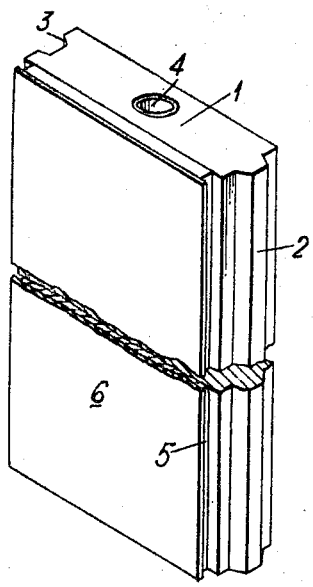

June 17, 1969 M. S. BLOOM 3,449,879
BUILDING PANEL WITH FOAM LAYER AND METHODS OF CONNECTING
AND ATTACHING THE PANEL
Filed Sept. 12, 1966

Inventor
MARTIN S. BLOOM
By Cushman, Darby & Cushman
Attorneys

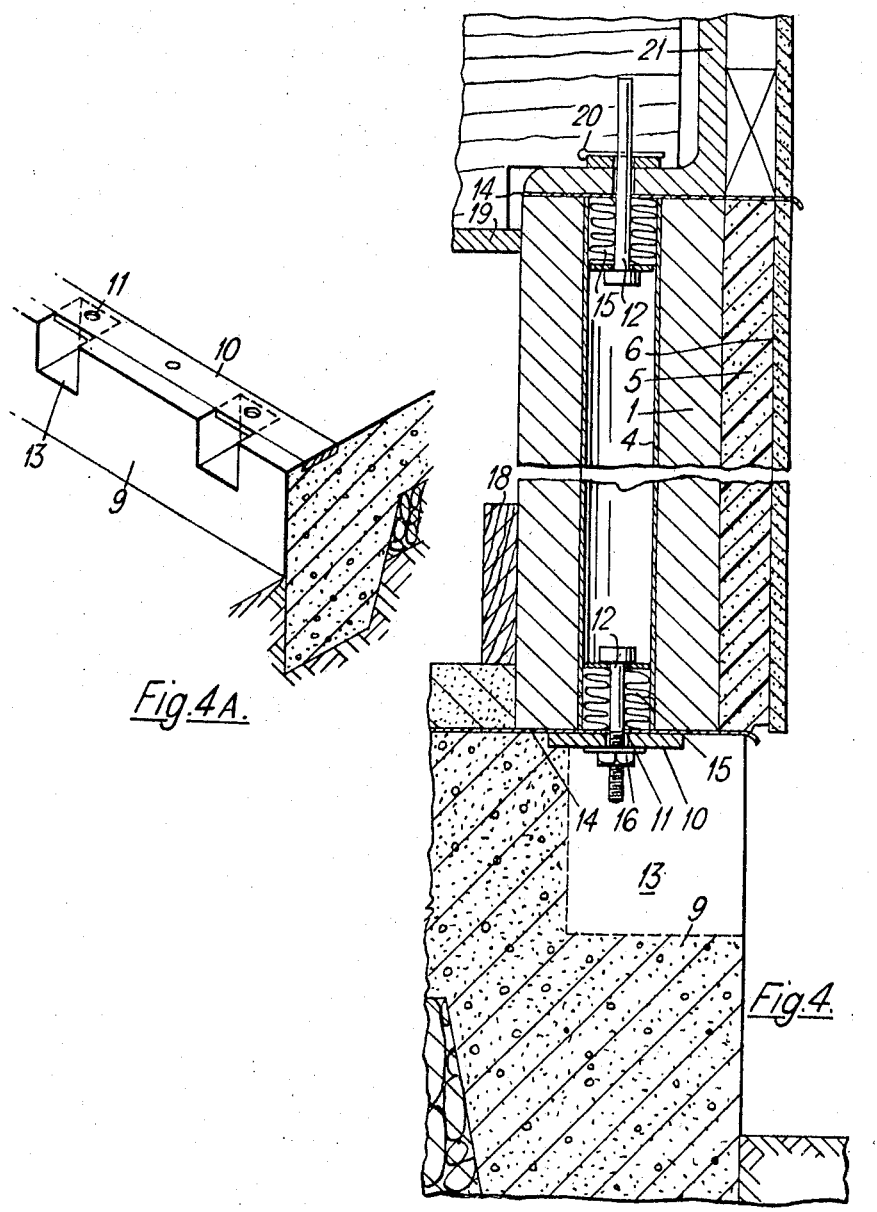

United States Patent Office 3,449,879
Patented June 17, 1969

3,449,879
BUILDING PANEL WITH FOAM LAYER AND
METHODS OF CONNECTING AND ATTACH-
ING THE PANEL
Martin S. Bloom, Norton-on-Tees, England, assignor to
Imperial Chemical Industries Limited, London, Eng-
land, a corporation of Great Britain
Filed Sept. 12, 1966, Ser. No. 578,520
Claims priority, application Great Britain, Sept. 27, 1965,
40,999/65
Int. Cl. E04c 1/00, 1/10, 1/30
U.S. Cl. 52—309                                    5 Claims The present invention relates to building panels, par-
ticularly though not exclusively to storey-height load-
bearing building panels for use in exterior walling.

In accordance with the invention there is provided a
laminated building panel comprising a cast gypsum panel
having bonded or otherwise secured thereto an outer layer
of weathering material. For example, the said outer layer
may be cast along with the gypsum panel, but in a pre-
ferred embodiment of the invention it is bonded thereto
by an intermediate layer of a foamed organic polymer.

The gypsum panel is preferably low-density cast gyp-
sum (for example foamed gypsum, or dilute slurry cast
gypsum), which has fire-resistant, thermally-insulating
and decorative properties, but does not completely fulfil
weathering requirements. High flexural strength and load-
bearing properties are imparted, particularly in the case
of storey-high building panels according to the inven-
tion, by providing the cast gypsum panels with some form
of internal reinforcement, for example aluminium or steel
wires or rods running the height of the panel, or a metal
mesh, for example a corrugated expanded metal mesh, or
metal tubing and channel sections as described and
claimed in our co-pending British patent application No.
31,166/63 or glass or other fibres. In the case of foamed
gypsum panels, the reinforcements are suitably of alu-
minimum which has approximately the same coefficient of
thermal expansion as foamed gypsum. A preferred rein-
forcement is rust-protected mild steel tubing which is
free to move so that differences in coefficients of thermal
expansion are of no importance. The gypsum panels are
preferably cast with tongues and grooves along at least
two of their opposite edges (for example along their
vertical edges in the case of storey-high panels).

In a preferred embodiment of our invention, the outer
layer of weathering material is formed from asbestos
cement which is cheap, stands up to weathering as well
as, for example, concrete, and takes decoration (for ex-
ample paint, polyvinyl chloride coatings or epoxy resin
fibre glass mixes) very satisfactorily. By itself, asbestos
cement is porous and has rather poor impact resistance,
but when backed by a layer of foamed organic polymer, as
in our preferred embodiment, it is impervious to moisture
and its impact resistance is enormously improved. Other
suitable weathering materials for this invention include
aluminium and steel facings, which may, for example, be
coated with polyvinyl chloride, and marine (outdoor)
plywood.

Suitable foamed organic polymers for the intermediate
layer of the laminated building panel of the invention in-
clude polyurethane foam, acrolein tetramer foam, poly-
styrene foam, phenol-formaldehyde foam and foamed
polyvinyl chloride. This intermediate layer (particular-
ly in the case of polyurethane foam) is, in effect, an
elastic self-adhesive layer which bonds the weathering
layer to the gypsum panel with sufficient yield to take up
differential thermal movements and so avoid cracking;
it is, of course, thermally insulating and, furthermore,
with the possible exception of phenol formaldehyde foam,
acts as a damp-proof membrane and vapour barrier.

The laminated building panel according to the inven-
tion may be produced simply by preparing the foamed
organic polymer layer separately and bonding it with ad-
hesive on the one hand to the gypsum panel and on the
other hand to the weathering layer, but is is preferred to
generate the organic polymer foam in situ between the two
layers, using the self-adhesive properties of the curing
foam, for example as described and claimed in our British
Patent No. 997,086, or by a press lamination technique.
In an alternative method, the foamed organic polymer
layer is first bonded to the weathering layer, and there-
after used as one wall of a mould for casting the gypsum
layer directly onto the foamed organic polymer layer.

The vertical edges of the foamed organic polymer layer
and of the weathering layer may be flush with those of
the gypsum panel, but it is preferred that they should be
slightly rebated for ease in assembling and jointing adja-
cent panels. A pair of laminated panels are placed edge
to edge, and their gypsum layers are joined together, by
means of their adjacent tongues and grooves, using a
plaster glue or other adhesive or mastic. The rebated
edges of the adjacent foamed organic polymer layers are
next joined by means of a suitable adhesive or mastic.
For example, in one preferred method, which is cheap
and which gives a continuous foamed layer, a foam may
be applied and generated in situ in the gap between the
rebated edges of adjacent foamed organic polymer layers.
In another preferred method, the gap is filled with a pre-
fabricated foam which is compressed and subsequently re-
leased to fill the gap, for example a compressive poly-
urethane jointing band or tape such as that sold under
the registered trademark "Compri-Band," which com-
prises a polyurethane foam impregnated with bitumen, or
other similar materials impregnated with polyester resin.
A suitable length of such jointing band or tape is com-
pressed and inserted into the gap where it expands to
fill the gap completely and provide a damp-proof joint
between the foamed organic polymer layers of adjacent
panels. Finally, the weathering layers of the adjacent
panels may be jointed by means of a suitable filler, for
example, gun mastic, cement mortar or the like, or pre-
formed plastic or metal capping strips.

Laminated building panels according to the invention
thus make possible the provision of a perimeter wall
having external weathering properties, an intermediate
damp-proof membrane, thermal insulation and an internal
plaster finish. When assembled with plaster glue, the inner
gypsum layers form a seamless plaster-finished interior
wall. The jointing of the foam layer provides a continuous
damp-proof membrane and thermal insulation, and the
jointing of the external weathering layer protects the joint-
ing of the foam layer from sunlight and mechanical
damage and provides a decorative external finish.

Figure 2:
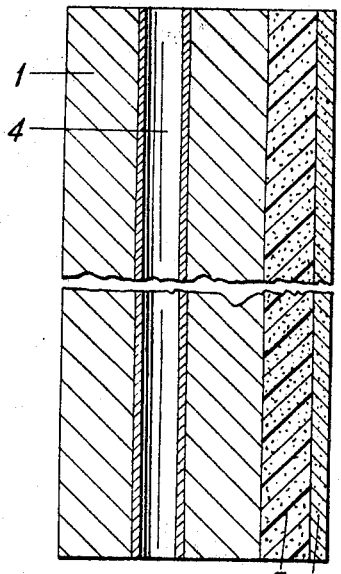
Figure 3:
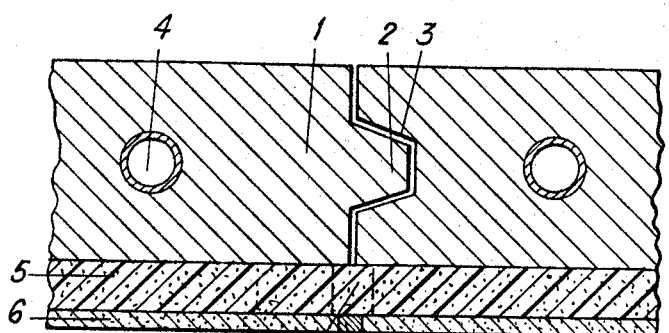

In the accompanying drawings, FIG. 1 is a perspective
view of a laminated building panel according to the inven-
tion, FIG. 2 is an end view, and FIG. 3 is a plan view
showing how a pair of adjacent panels are adapted to be
joined together. FIGS. 4 and 4A are views of the connect-
ing means of the building panels to a concrete edge beam.
The gypsum block 1 is provided with a tongue 2 and a
groove 3, and with an internal reinforcing mild steel tube
4. The intermediate foamed organic polymer layer is des-
ignated by 5 and the outer weathering layer by 6. Both
of the layers 5 and 6 are rebated slightly with respect to
the gypsum block 1 (the layer 5 to a slightly greater
extent than the layer 6) so as to form gaps 7 and 8. The
gap 7 between adjacent foamed polymer layers is first
filled by generating polymer foam in situ therein so that
the two adjacent layers 5 form a continuous foamed
damp-proof membrane; thereafter the gap 8 between ad-
jacent weathering layers 6 is filled by a suitable capping
strip.

One simple method of erecting buildings from building panels in accordance with the invention is illustrated diagrammatically in FIGS. 4 and 4A. The base for the construction may comprise, for example, a concrete edge beam 9 having secured to the upper side thereof a base plate 10 provided with fixing holes 11 to accommodate bolts 12 for securing the panels to the base. The concrete edge beam 9 is recessed, as shown at 13, to provide access points for handling the bolts 12, which recesses are subsequently filled in with a suitable filling material. A damp-proof course 14 is preferably laid above the edge beam 9 and base plate 10, and a panel 1, 5, 6 in accordance with the invention is positioned thereabove (with the weathering layer 6 facing outwards) so that the fixing hole 11 is in correspondence with the inner reinforcing tube 4. A compressible bung 15, for example a rubber bung, is inserted in the tube 4, and the panel is secured to the base plate 10 by the bolt 12 which passes through the bung 15 and is tightened up, until the bung is fully compressed, by a washer 16. Screed 17, for flooring, may be laid down on the inner side of the panel, suitable skirting 18 applied to the inner gypsum face of the panel, and a ceiling 19 built at an appropriate level.

Instead of the bolt and washer arrangement 12, 16 already described, the bolt 12 may be secured by a pin 20 as shown at the top of FIG. 4, which illustrates the upper end of the panel secured to a steel edge beam 21.

I claim:
1. A laminated building panel comprising: a cast gypsum panel; an outer layer of weathering material; means bonding said layer to said panel and including an intermediate layer of a foamed organic polymer; and means for rendering said panel load-bearing and including the provision in said panel of internal metal reinforcing means, said gypsum panel being tongued and grooved along at least two of its edges, and the foamed organic polymer layer and the outer layer being rebated with respect to the gypsum.

2. Method of connecting at least two laminated building panels wherein each of said panels comprises: a cast gypsum panel tongued and grooved along at least two of its edges; an outer layer of weathering material; means bonding said layer to said panel and including an intermediate layer of a foamed organic polymer, the foamed organic polymer layer and the outer layer being rebated with respect to the gypsum panel; said method comprising the steps of placing the cast gypsum panels edge to edge and joining their adjacent gypsum layers together, by means of their adjacent tongues and grooves, using an adhesive for filling in the gap between the rebated edges of the adjacent foamed organic polymer layers by applying thereto a foam adapted to fill said gap, and finally filling in the gap between the rebated edges of the adjacent outer weathering layers.

3. Method as claimed in claim 2, wherein said filling foam is generated in situ in said gap.

4. Method as claimed in claim 2, wherein said filling foam is a prefabricated foam introduced into said gap in a compressed condition and subsequently released to fill said gap.

5. Method of connecting a laminated building panel to an external supporting member, wherein said building panel comprises: a cast gypsum panel; an outer layer of weathering material; means bonding said layer to said panel and including an intermediate layer of a foamed organic polymer; and means for rendering said panel load-bearing and including the provision in said panel of internal metal reinforcing tubes, said method comprising the steps of inserting a compressible bung in the end of at least one of said metal tubes, passing a bolt through said bung and said external supporting member, tightening up said bolt until the bung is substantially compressed, and securing said bolt in position.

References Cited

UNITED STATES PATENTS

| | | | |
|---|---|---|---|
| 2,887,732 | 5/1959 | Kloote. | |
| 3,284,980 | 11/1966 | Dinkel | 52—600 |
| 2,972,559 | 2/1961 | Allen. | |
| 3,295,278 | 1/1967 | Muhm | 52—612 X |
| 3,303,617 | 2/1967 | Hessburg | 52—309 X |
| 3,305,991 | 2/1967 | Weismann | 52—612 X |
| 3,319,388 | 5/1967 | Olsen | 52—309 X |

JOHN E. MURTAGH, *Primary Examiner.*

U.S. Cl. X.R.

52—235, 437, 471, 593, 600, 741, 744